United States Patent [19]
Walker

[11] 4,261,930
[45] Apr. 14, 1981

[54] EVAPORATIVE COOLING SYSTEM

[75] Inventor: Dean M. Walker, Loveland, Colo.

[73] Assignee: Byco Sales, Ltd., Greeley, Colo.

[21] Appl. No.: 695,385

[22] Filed: Jun. 14, 1976

[51] Int. Cl.³ .............................................. B01F 3/04
[52] U.S. Cl. ................................... 261/92; 62/314;
  62/DIG. 16; 98/2.11; 98/2.14; 261/28; 261/70;
  261/DIG. 4
[58] Field of Search ..................... 261/28, 70, 80, 92,
  261/DIG. 4, DIG. 15, 72 R, 97, 91, 35, DIG.
  46; 98/2.11, 2.14; 62/DIG. 16, 310, 314

[56] References Cited
U.S. PATENT DOCUMENTS

| | | | |
|---|---|---|---|
| 2,435,798 | 2/1948 | Rice et al. ...................... | 261/DIG. 4 |
| 2,870,864 | 1/1959 | Brixius et al. ..................... | 261/80 X |
| 3,189,328 | 6/1965 | Hotchkiss et al. ................. | 261/92 X |
| 3,266,784 | 8/1966 | Saito .................................. | 261/92 X |
| 3,282,574 | 11/1966 | De Pas ............................... | 261/91 X |
| 3,315,948 | 4/1967 | Martin ............................... | 261/92 X |
| 3,352,353 | 11/1967 | Stevens et al. ..................... | 261/DIG. 4 |
| 3,386,711 | 6/1968 | Williams ............................ | 261/92 X |
| 3,481,588 | 12/1969 | Lobb ............................. | 261/DIG. 15 |
| 3,606,982 | 9/1971 | Anderson ...................... | 261/DIG. 4 |
| 3,758,086 | 9/1973 | Pugh .................................. | 261/92 |
| 3,834,680 | 9/1974 | Yost et al. ............................ | 261/92 |

Primary Examiner—Richard L. Chiesa
Attorney, Agent, or Firm—Hugh H. Drake

[57] ABSTRACT

An evaporative cooling system includes a belt of a material to which a liquid may cling and which is sufficiently transparent to the flow of air therethrough to achieve evaporation of the liquid on the belt by the air. A portion of the belt dips into a reservoir of water. Air is propelled through the belt and the belt is moved through the water. A float valve is responsive to the level of water in the reservoir for maintaining that level upon receipt of an input flow of the water. A separate sump contains a reserve supply of the water. A pump is operated along with operation to move the belt for supplying liquid from the sump through the float to the reservoir.

7 Claims, 10 Drawing Figures

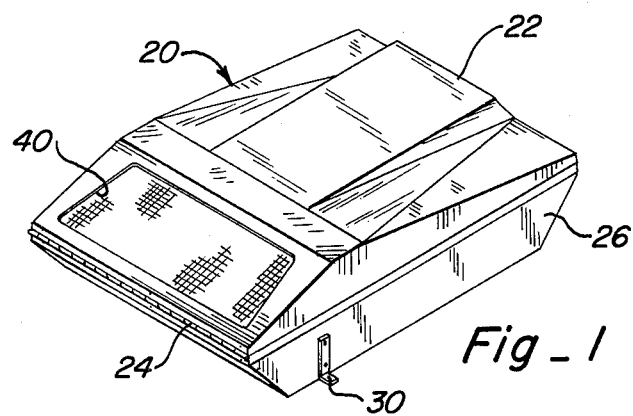
Fig_1
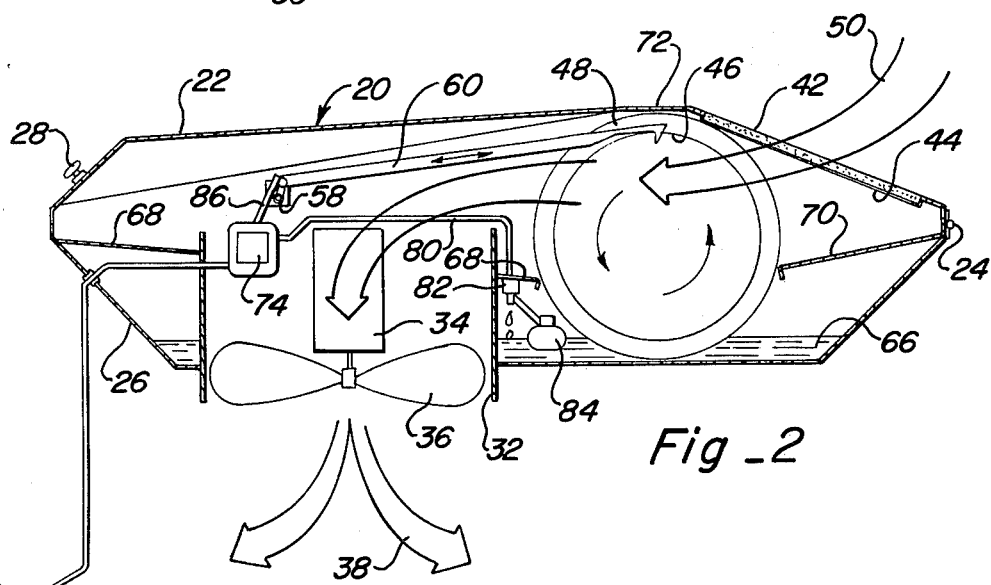
Fig_2
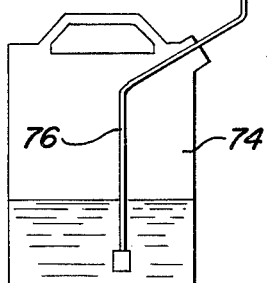
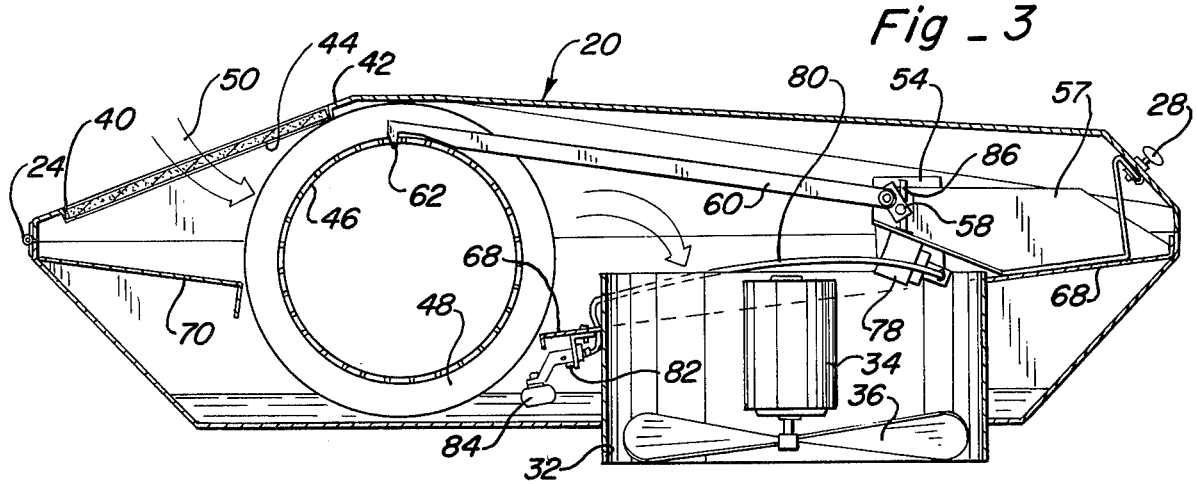
Fig_3

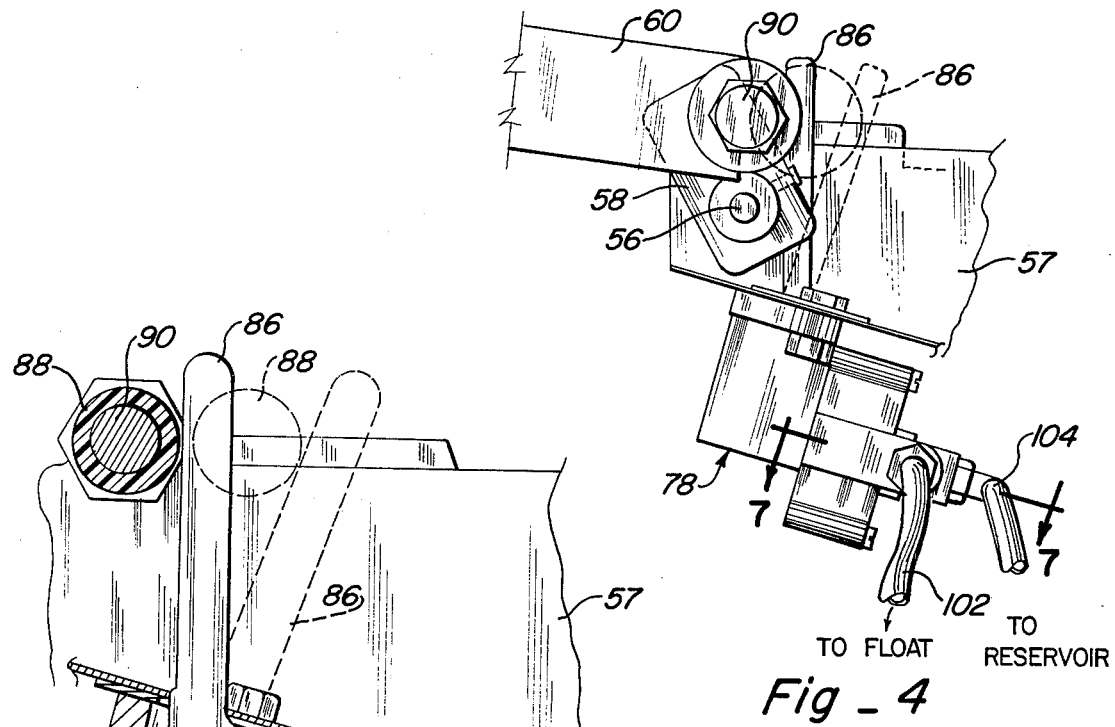
Fig_4
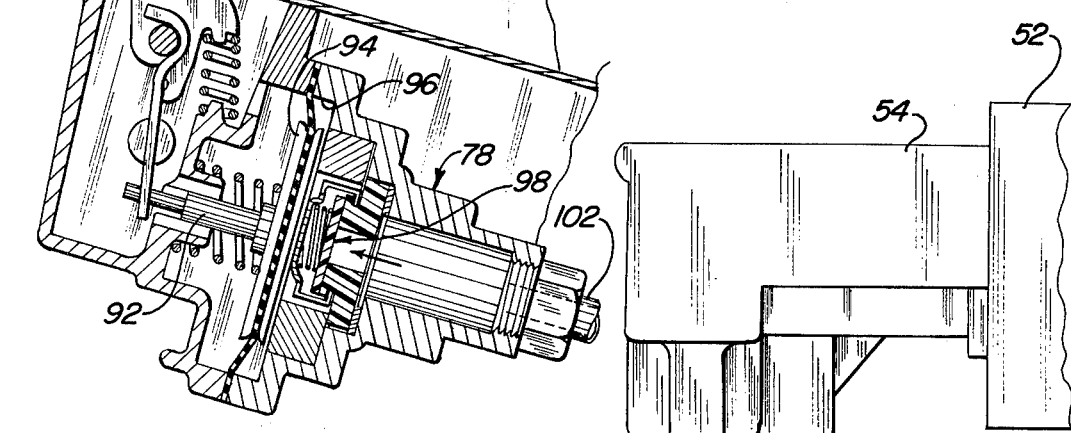
Fig_6
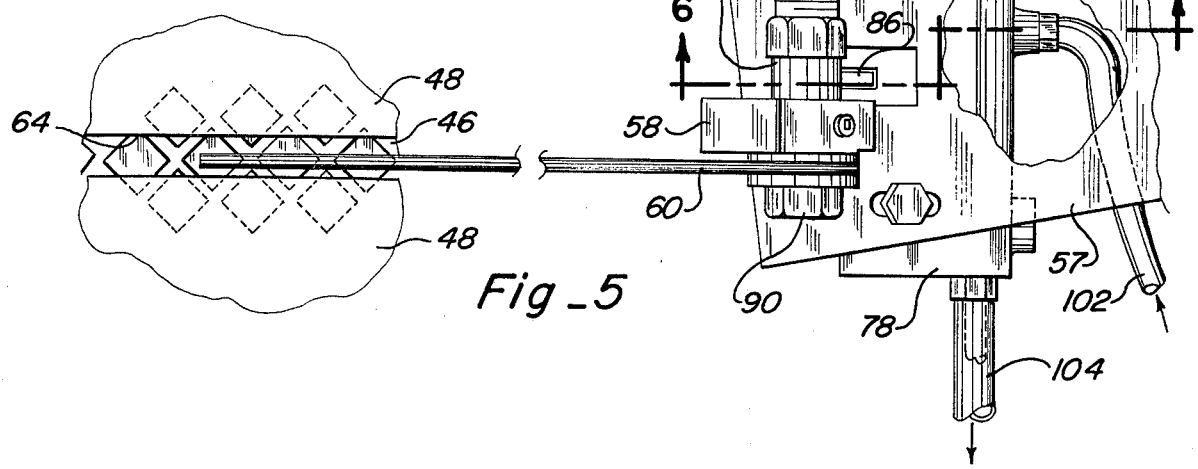
Fig_5

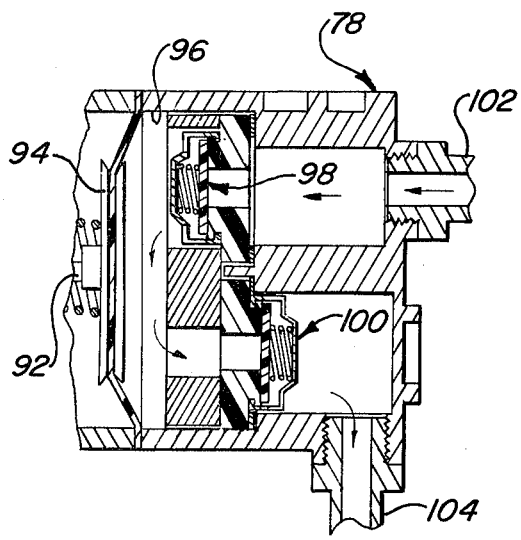
Fig_7
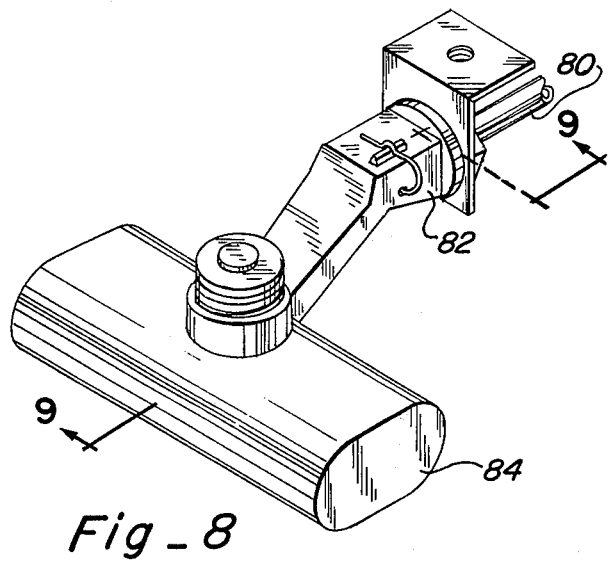
Fig_8
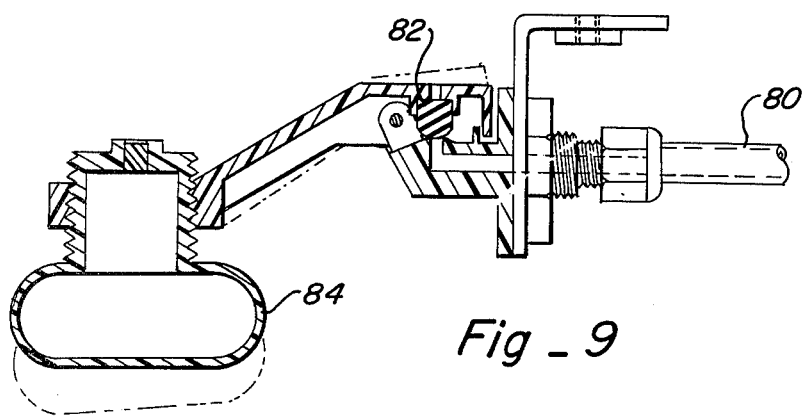
Fig_9

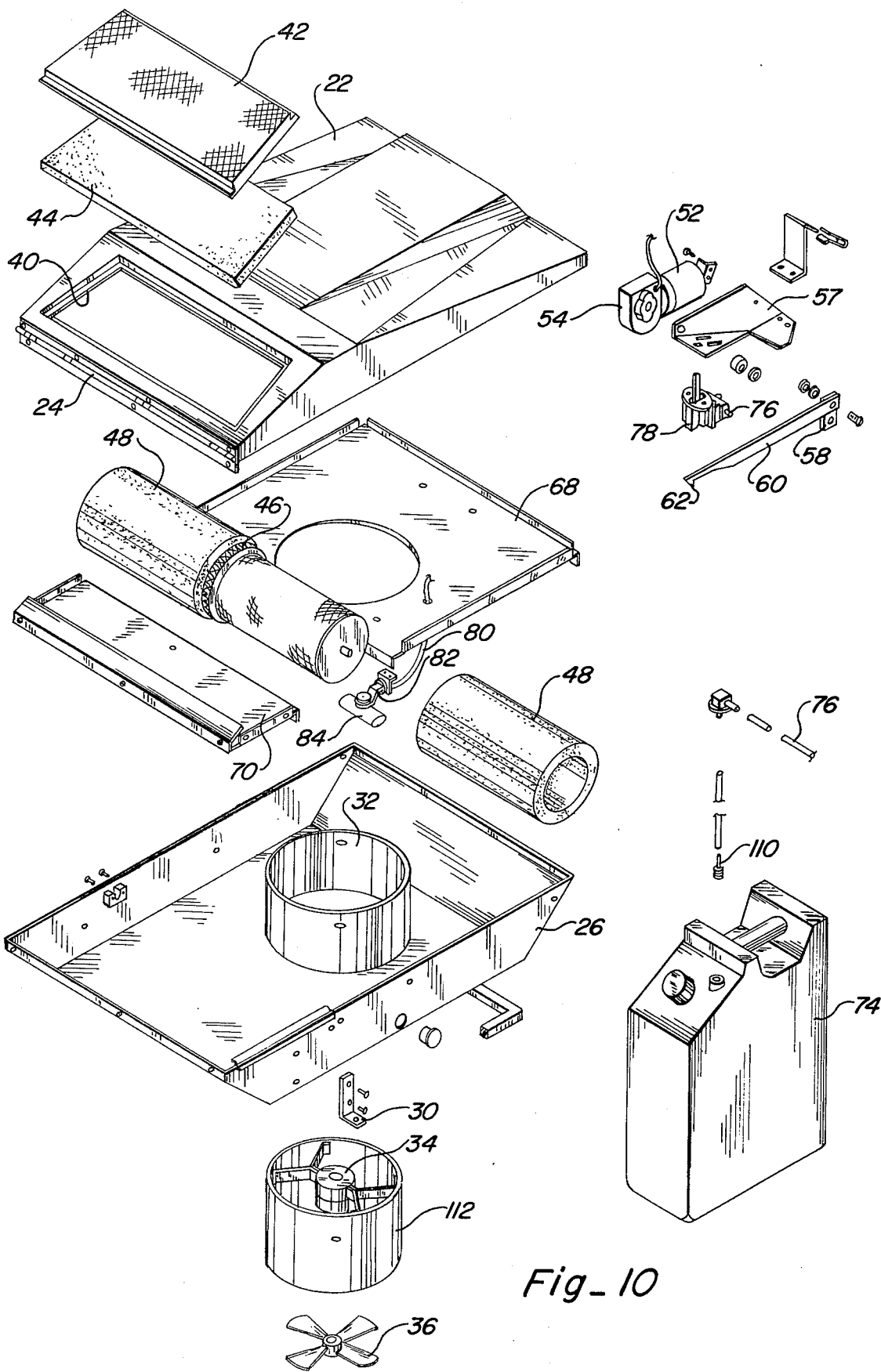
Fig_10

EVAPORATIVE COOLING SYSTEM

The present invention pertains to an evaporative cooling system. More particularly, it relates to an arrangement for supplying the evaporation liquid to such a system.

U.S. Pat. No. 3,834,680, issued Sept. 10, 1974, discloses what has proved to be a highly successful evaporative-type cooler. One of its greatest usages so far has been in connection with its mounting on top of the personnel cab of a vehicle such as an agriculture machine. It is fully capable of supplying substantially cooled and filtered air into any enclosure beneath, or ducted from beneath, a more or less flat roof or other platform. While that patent, which is incorporated herein by reference, may be consulted directly for further description of a detailed nature, it may be noted that it involves use of a belt of a material to which water may cling and which is sufficiently transparent to the flow of air therethrough so as to achieve evaporation of the water on the belt by the air. A reservoir of water is maintained in a position through which a portion of the belt extends. The air is propelled through the belt, and, in turn, the belt is moved through the water in the reservoir. The air propelled through the moistened belt is exhausted into the vehicle cab or other enclosure. Various splash panels and the like are provided in order to guard against splashing of water from the reservoir into the air outlet.

In usage, the apparatus of the patent requires that water for the reservoir be replenished from time to time. Of course, this may be accomplished manually. However, the inclination of the user is to fill to maximum possible capacity in order to decrease the frequency of replenishment. Moreover, that inclination can lead to a tendancy of overfill as a result of which water may be caused to splash into the air outlet. Moreover, it is inconvenient to have to cease operations from time to time for the purpose of such replenishment.

Evaporative cooling systems are known in which a separate sump or other source of water is maintained in order to afford a source of refill. These typically have been automated in function by the additional provision of an electrically-driven pump which may be turned on manually or automatically operated in an effort to seek the maintenance of a suitable depth of water in the cooler itself. Such systems not only require a separate motive source of pumping power, but also, at least in many cases, have been subject to failure in the event of complete depletion of the extra water contained in the reserve sump.

It is, accordingly, a general object of the present invention to provide a new and improved evaporative cooling system that maintains a suitable water level in the cooler itself while avoiding difficulties and deficiencies such as those that are adverted to above.

Another object of the present invention is to provide an evaporative cooling system having a new and improved automatic-fill arrangement.

A further object of the present invention is to provide an evaporative cooling system in which an automatic-fill arrangement is incorporated with minimized increased cost.

A still further object of the present invention is to provide an evaporative cooling system with a new and improved automatic-fill arrangement that avoids difficulties in the event of the exhaustion of water in the reserve sump.

The invention thus pertains to an evaporative cooling system that has a belt of a material to which a liquid may cling and which is sufficiently transparent to the flow of air therethrough to achieve evaporation of the liquid on the belt by the air. A reservoir of the liquid is maintained in a position through which a portion of the belt extends. The air is propelled through the belt, and the belt is moved through the liquid. Further included is a float valve that responds to the level of the liquid in the reservoir for maintaining that level upon receipt of an input flow of the liquid. A sump contains a reserve supply of the liquid. Finally, there also is means responsive to operation of the moving means which supplies liquid from the sump through the float valve to the reservoir.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 1 is a perspective view of an evaporative cooling unit suitable for mounting on a flat surface;

FIG. 2 is a vertical cross-sectional view, taken generally longitudinally through FIG. 1 but partially in schematic form;

FIG. 3 is a cross-sectional view taken opposite that of FIG. 2 and also partially schematic in form;

FIG. 4 is an enlarged fragmentary side-elevational view of a portion on the apparatus shown on FIG. 3;

FIG. 5 is a similarly enlarged fragmentary top plan view of a portion of the apparatus shown in FIG. 3;

FIG. 6 is a fragmentary cross-sectional view taken along the line 6—6 in FIG. 5;

FIG. 7 is an enlarged fragmentary cross-sectional view taken along the line 7—7 in FIG. 4;

FIG. 8 is an enlarged perspective view of a component assembly shown in FIGS. 2 and 3;

FIG. 9 is a cross-sectional view taken along the line 9—9 in FIG. 8; and

FIG. 10 is an exploded perspective view showing the assembly of the principal components included in the unit of FIG. 1.

An evaporative cooler unit 20 includes a top shell 22 joined at one end by a hinge 24 to a bottom shell 26 as will be apparent from the drawings. Most of the basic components are capable of being readily molded from plastic, although a material such as sheet metal also may be used. A latch 28 serves to hold the two shells together in use.

As shown, a bracket 30 enables securing of the unit to a generally flat top or upper surface of an enclosure or the like to be cooled. A similar bracket may be provided on the other side and also toward the other end or on the rear of the unit.

Upstanding in the bottom wall of shell 26 is an air duct 32. Centrally mounted within duct 32 is a fan 34 with its blades 36 oriented to exhaust air from within the interior of the unit downwardly into any enclosure or duct work below as indicated by arrows 38. Formed near the hinged end of shell 22 is an air inlet opening 40 protected by a grill 42 and underlaid by a layer 44 of a dry material such as natural fiber or suitable synthetic.

Disposed more or less just inwardly beyond grill 42 and filter 44 is a drum 46 suitably journaled on the side walls of bottom shell 26. Drum 46 is in the form of a cylindrical metal grill of metal or the like such as to permit the passage of air through its walls and also for a driving purpose to be further described. Surrounding drum 46 is a continuous belt 48 of a material to which water will cling and which is yet sufficiently transparent to the flow of air therethrough as to achieve evaporation of such clinging water on the belt by the air. A suitable material is a polyurethane foam. In use, air entering through grill 42 follows a path as indicated by arrow 50 and which extends through the cylindrical wall material on drum 46 and then passes into well 32 and on outwardly as a result of the propulsion created by fan 34.

Driving drum 46 is a motive power source that, in this case, includes an electric motor 52 coupled through a gear reduction unit 54 by a drive shaft 56. These components are carried by a bracket 57. Secured on the outer end of shaft 56 is a link 58 that serves as an eccentric. Secured to a portion of link 58 radially displaced from the axis of shaft 56 is an arm 60 that projects away from link 58. On the far end of arm 60 is a downwardly projecting tooth 62 receivable within openings defined in drum 46 and exposed by a slot 64 defined between adjacent portions of belt 48. When motor 52 is energized, the outer end of link 58 gyrates around the axis of shaft 56 so as to reciprocate arm 60 back and forth. As a result, tooth 62 is caused to first engage in a given opening in drum 46 and pull the wall of that opening toward the motor, then disengage from such opening, again move outwardly and engage a new opening in drum 46. Therefore, a rachet-like rotation of drum 46, together with belt 48, is caused to occur.

The lower portion of shell 26 is shaped to define a reservoir 66. Usually, the evaporative liquid to be employed is simply water. Another liquid more effective for evaporative cooling might be substituted; hereinafter, the use of water will be assumed. In any case, reservoir 66 is formed and disposed as to surround well 32 and to contain the water at a level such that belt 48 dips into the water in the reservoir. This permits the water to cling to the material of belt 48 and thereafter to be evaporated upon the passage of air drawn through the unit. Moreover, the filter tends to be cleaned as it progressively is dipped back into the reservoir.

In order to maintain the reservoir of water in place, and particularly to prohibit its being splashed by movement, as when the unit is mounted on the vehicle, into well 32, a baffle plate 68 projects from the rear wall of bottom shell 26, near its upper periphery, around well 32 and into contact with filter pad or belt 48. Another baffle plate 70 extends from just below hinge 24 and also into frictional contact with pad 48 on the other side of drum 46. Plates 68 and 70 are arranged so as to prevent splashing of liquid from the reservoir into well 32 and thereby into the enclosure or ductwork below. In addition, the dimensions and conformation of upper shell 22 are such that a portion of its top surface, as at 72, has rubbing contact with pad 48. The rubbing contact completes an air seal so that air following the direction of arrow 50 is constrained to pass through the filter and drum in its travel on into well 32.

As so far described herein, the basic mechanical principles involved are the same as those disclosed in the aforesaid U.S. Pat. No. 3,834,680. While improvements in construction are revealed in the detailed disclosure of this application, more of which will be forthcoming hereinafter, that patent again is cross-referenced for the purpose of any necessary further understanding.

The present system includes a separate sump 74 in which a reserve supply of the water is contained. As illustrated, sump 74 may conveniently be a conventional five-gallon container or the like. An inlet conduit 76 extends from the bottom portion of sump 74 to a pump 78. An outlet conduit 80 leads from pump 78 to a valve 82 that supplies a replenishing supply of water to reservoir 66 under the control of a float 84.

In itself, float 84 and valve 82 are entirely conventional. Float 84 is simply an air-filled container linked to valve 82, so as to close the latter when the level of liquid within reservoir 66 reaches a selected maximum height. On reaching the maximum level, valve 82 is shut off so as to preclude the further supply of liquid to reservoir 66.

As such, pump 78 also is available in conventional form. However, the kind of pump herein selected has certain features which contribute significantly to the effectiveness of the overall combination. Pump 78 is operated by a lever 86 that acts as a cam follower bearing upon a sleeve 88 carried by the shaft of a bolt 90 which also constitutes the off-center pivot for the end of arm 60 driven as a result of rotation of shaft 56. Thus, energization of motor 52 to effect movement of belt 48 also serves to swing lever 86 back and forth. This action operates pump 78. In more detail as shown in FIG. 6, operation of lever 86 serves, through a flexible connection with a spring-loaded shaft 92, to reciprocate a sealed piston 94 that creates alternate conditions of pressure and vacuum within a pumping chamber 96. Communicating with chamber 96 are a pair of check valves 98 and 100. Each such check valve consists simply of an aperture covered by a spring-loaded resilient pad so as to permit the flow of fluid, either water or air, in only one direction. Check valve 98 is aligned with an inlet conduit 102 so as to permit water to flow into chamber 96, while check valve 100 is effectively in series, as well as in communication with chamber 96, so as to permit flow only in the direction outwardly from chamber 96 and into an outlet conduit 104.

In operation, reciprocation of arm 60 for the purpose of moving belt 48 step by step serves also to reciprocate lever 86. In turn, that operates pump 78 so as continually to supply pulses of the water from sump 74 to float valve 82. Whenever the latter is open as a result of demand indicated by the position of float 84, water is conveyed from sump 74 into reservoir 66. Accordingly, a suitable level of water within reservoir 66 is maintained at all times that a reserve supply is available within sump 74.

As stated, pump 78 is of known kind. However, its characteristics are especially selected for inclusion in the system herein described. It will be observed that its actual pumping mechanism, from lever 86 through diaphragm 94, is entirely separate from its flow mechanism that includes check valves 98 and 100. Accordingly, the pumping mechanism is enabled to continue to operate regardless of conditions with chamber 96 and involving valves 98 and 100. At the same time, valves 98 and 100 each guard against any possibility of the withdrawal of water from reservoir 66 in the event of complete depletion of the supply of water in sump 74. Moreover, the arrangement of pump 78 is such that the absence of a reserve supply of water within sump 74 cannot in any way harm pump 78, or any of its parts, notwithstanding the fact of continued operation of the pump. Still further, pump 78 is of a kind which does not substain injury as a result of attempts to pump the water when float valve 82 is closed. In this connection, however, it should also be noted that, in the alternative, float valve 82 may be included in the inlet to pump 78. In that case, the supply of water from sump 74 to pump 78 is shut off whenever reservoir 66 is filled. Even then, pump 78 has the character to permit its continued operation without harm.

FIG. 10 is merely an example of one complete assembly in accordance with a preferred embodiment. A person skilled in the art will recognize that this view depicts that which has been described while illustrating further details such as particular manners of assembly with regard to such things as the use of various fasteners and the formation of mating edge surfaces. Also depicted are different sealing elements and the like that desirably are included. Still further, this illustration reveals additional features that desirably may be included such as an impurity filter 110 in the outlet from sump 74 and formation of the motor assembly to include a fan shroud 112 that fits within and forms a part of well 32.

The unit herein described continues the principles of the evaporative cooling art, while at the same time enabling the ready supply from an auxillary source or sump of reserve water. Moreover, the availability of that reserve supply is afforded in a manner that is both automatic and yet safe from its own exhaustion. In addition, the auxillary supply is accomplished in a manner that does not require any kind of separate motive drive source for its operation.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In an evaporative cooling system having an endless belt of a material to which a liquid may cling and which is sufficiently transparent to the flow of air therethrough to achieve evaporation of said liquid on said belt by said air, means for maintaining a reservoir of said liquid in a position through which a portion of said belt extends, means for propelling said air therethrough and means for moving said belt through said liquid, the improvement comprising:
   a float valve responsive to the level of said liquid in said reservoir for maintaining said level upon receipt of an input flow of said liquid;
   a sump containing a reserve supply of liquid;
   a conduit extending from said sump to said float valve;
   and means powered by said moving means for supplying energy to pump and pumping liquid from said sump through said conduit and said float valve to said reservoir.

2. A system as defined in claim 1 in which said moving means includes a lever which reciprocates lengthwise in movement of said belt, in which a cam is affixed with respect to one portion of said lever, and in which a cam follower responsive to said cam effects operation of said pumping means.

3. A system as defined in claim 1 in which said pumping means responds to movement of an element of said moving means for effecting the supply of said liquid.

4. A system as defined in claim 1, in which said pumping means includes means for preventing backflow through said pumping means from said reservoir to said sump in the absence of liquid in said sump.

5. A system as defined in claim 1 in which said pumping means includes means for enabling continued harmless operation of said pumping means in the absence of liquid in said sump.

6. A system as defined in claim 1 in which said pumping means is activated by said moving means, and in which said moving means effects movement of said belt in a succession of steps, and in which said pumping means is operated one time during each of said steps.

7. In an evaporative cooling system comprising:
   an endless belt of a material to which a liquid may cling and sufficiently transparent to the flow of air therethrough to achieve evaporation of said liquid on said belt by said air;
   a reservoir of said liquid through which a portion of said belt extends;
   means for propelling said air through said belt;
   a motor for supplying motive power;
   a driving linkage, coupled between said motor and said belt, for moving said belt through said liquid in response to said motive power;
   a sump containing a reserve supply of said liquid;
   a pump, coupled between said sump and said reservoir, for delivering liquid from said sump to said reservoir;
   means, coupled between said driving linkage and said pump, for actuating said pump in response to movement of said driving linkage in response to said motive power;
   and means for regulating delivery of said additional quantity in response to the volume of said liquid in said reservoir.

* * * * *